United States Patent [19]
Weinmann et al.

[11] Patent Number: 5,715,653
[45] Date of Patent: Feb. 10, 1998

[54] METHOD AND AN APPARATUS FOR BRINGING TOGETHER AND JOINING CARDS AND PRINTED CARD CARRIERS

[75] Inventors: Karlheinz Weinmann, Utting; Eduard Schmid, Untermeitingen; Thomas Watzek, Augsburg, all of Germany

[73] Assignee: Boewe Systec AG, Augsburg, Germany

[21] Appl. No.: 541,161

[22] Filed: Oct. 11, 1995

[30] Foreign Application Priority Data

Mar. 8, 1995 [DE] Germany ............... 195 08 282.6

[51] Int. Cl.$^6$ ............................................. B65B 61/02
[52] U.S. Cl. ........................... 53/411; 53/131.2; 53/55; 364/478.09
[58] Field of Search ................ 53/206, 460, 411, 53/131.2, 284.3, 53, 54, 55; 493/324, 325, 231, 243, 264, 233, 216; 225/96, 100; 364/478.08, 478.17

[56] References Cited

U.S. PATENT DOCUMENTS

| | | | |
|---|---|---|---|
| 5,025,610 | 6/1991 | Grausher | 53/411 |
| 5,046,299 | 9/1991 | Hansen | 53/411 |
| 5,146,344 | 9/1992 | Bennett et al. | 358/296 |
| 5,433,364 | 7/1995 | Hill et al. | 225/96 |
| 5,538,232 | 7/1996 | Long | 53/411 |
| 5,555,703 | 9/1996 | Gombault et al. | 53/411 |
| 5,557,529 | 9/1996 | Warn et al. | 364/479.02 |

FOREIGN PATENT DOCUMENTS 6144428  5/1994  Japan ............... 53/411

*Primary Examiner*—Lowell A. Larson
*Assistant Examiner*—Ed Tolan
*Attorney, Agent, or Firm*—Wolf, Greenfield & Sacks, P.C.

[57] ABSTRACT

A method of bringing together and joining cards, which are provided with an identification mark, and printed card carriers associated with the respective cards, comprises the steps of: providing the card; detecting the identification mark of the card; associating a print job number with the card; reading a data base by means of the identification mark; printing on the card carrier data read from the data base as well as the print job number; detecting the print job number of the card carrier prior to joining the card carrier to the card; determining whether the print job number of the card, which is about to be joined to the card carrier, corresponds to the print job number detected in the preceding step; and, provided that the print job number of the card and that of the card carrier correspond, bringing together and joining the card and the card carrier.

20 Claims, 4 Drawing Sheets

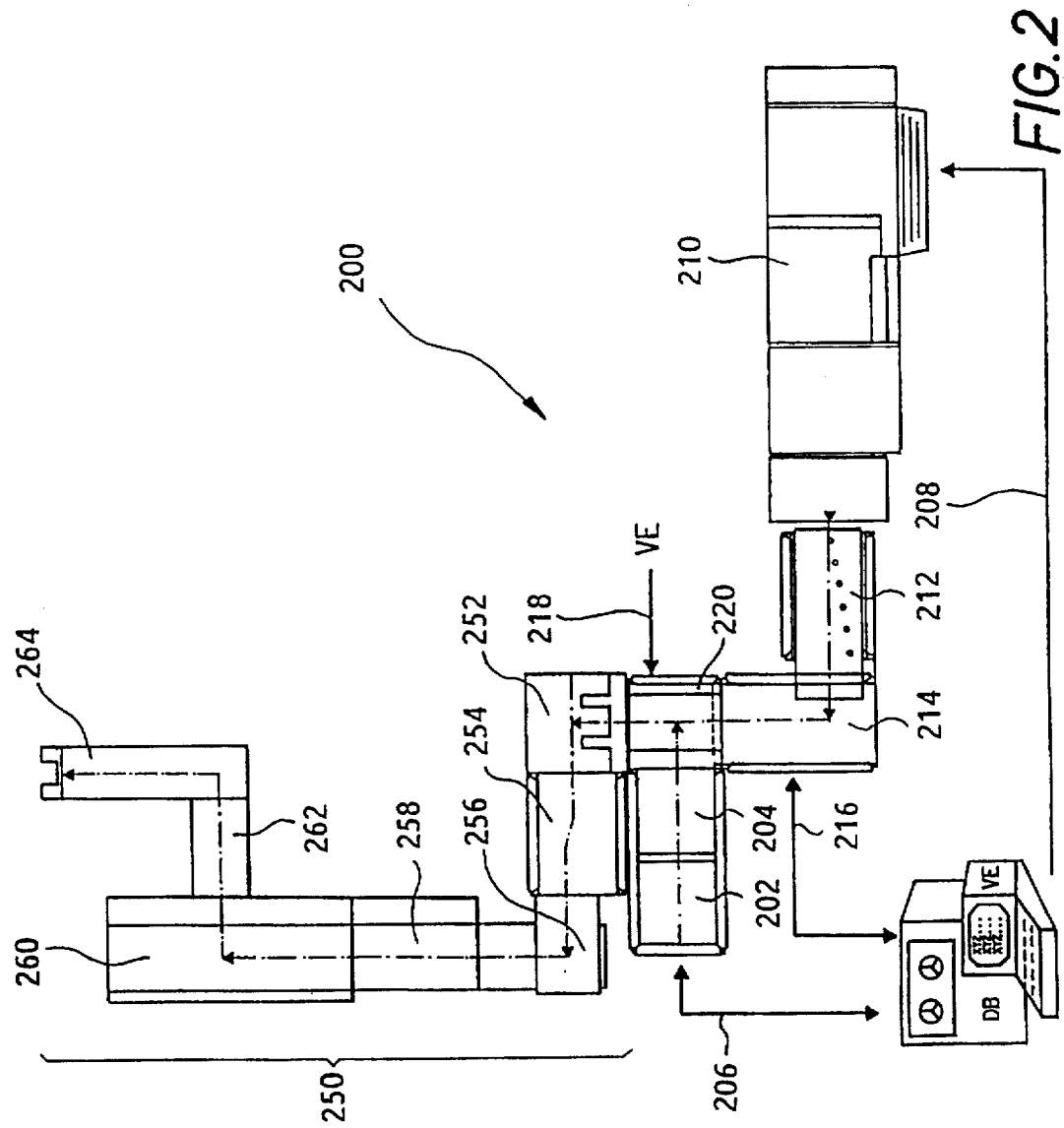

METHOD AND AN APPARATUS FOR BRINGING TOGETHER AND JOINING CARDS AND PRINTED CARD CARRIERS

FIELD OF THE INVENTION

The present invention refers to a method and an apparatus for bringing together and joining cards, which are provided with an identification mark, and printed card carriers associated with the respective cards.

DESCRIPTION OF THE PRIOR ART

It is generally possible to automatically join (apply) a variable number of plastic cards, such as thick plastic cards, type CR-80, to card carriers by means of known systems. The card carriers having applied thereto the plastic cards are then packed into envelopes, e.g. in an enveloping station, and they are either deposited in a scalelike mode of arrangement or subjected to further treatment, such as sorting or encircling by a plastic strip.

In a known method and in a known apparatus, presorted and personalized plastic cards are applied to presorted and personalized card carriers. The term "personalized" means in this connection that the plastic card and the card carrier, respectively, have already been provided with the necessary data, such as name, address etc.. The card carriers can in this case be supplied from a stack of continuous sheets or from a stack of single sheets.

In FIG. 5, a known apparatus is shown for applying plastic cards and card carriers. The apparatus is designated generally by reference numeral 500.

In this known apparatus, the plastic cards are contained in a turret means 502 comprising four magazines 504. Individual plastic cards 506 are discharged from said turret means 502 and supplied to a reader 508. The supply of the individual cards to the various stations takes place via so-called stop points 510 at which the cards stop until a signal arrives from a subsequent station which indicates that said subsequent station is ready to receive the card.

In the reader 508, an identification number (ID number) of the plastic card 506 is read. A processing means (VE) 512 detects and stores said identification number. Subsequently, the plastic card 506 is guided to an application means 514 via a plurality of stop points 510. Prior to supplying the plastic card 506 to the application means 514, said plastic card may be provided with a gummed label at a station 516 so as to guarantee the subsequent connection to the card carrier.

The card carrier is supplied from a second direction (arrow 518), which does not correspond to the direction in which the plastic card 506 is supplied to the application means 514.

The card carrier is contained in a stack 520 comprising the card carriers in a presorted form. As has been described hereinbefore, the card carriers have already been provided with the relevant data, such as the name and the address of the person receiving the card.

From said stack 520, the card carrier is supplied to a reader 522, which will read an identification number printed on said card carrier. This identification number is compared (arrow 524) with the identification number of the card occupying the last stop point prior to the application means 514. If the identification numbers correspond, the plastic card and the card carrier will be connected.

In this known apparatus 500, all components are controlled by the same system clock, i.e. the number of strokes elapsing until a plastic card reaches the application means 514 after the reading of the identification number at 508 is known, so that, depending on this known transit time, the supply of the card carriers from the stack 520 and the examination of the identification numbers can be controlled such that the card carrier will arrive at the application means 514 at the same time as the plastic card 506 belonging to this card carrier.

One disadvantage of this known apparatus is to be seen in the fact that the plastic cards as well as the card carriers must be presorted and that, in addition, the card carriers must already be personalized. This results in a substantial restriction of the flexibility of such an apparatus.

SUMMARY OF THE INVENTION

It is a major object of the present invention to provide a method and an apparatus which are used for bringing together and joining cards and card carriers and the flexibility of which is substantially improved.

According to one aspect of the invention, this object is achieved by a method of bringing together and joining plastic cards, which are provided with an identification mark, and printed card carriers associated with the respective plastic cards, characterized by the following steps:

a) providing the plastic card;

b) detecting the identification mark of said plastic card;

c) associating a print job number with said plastic card;

d) reading a data base by means of said identification mark;

e) printing on the card carrier data read from the data base as well as the print job number;

f) detecting the print job number of the card carrier prior to joining said card carrier to the plastic card;

g) determining whether the print job number of the plastic card, which is about to be joined to the card carrier, corresponds to the print job number detected in step f); and, h) provided that the print job number of the plastic card and that of the card carrier correspond, bringing together and joining the plastic card and the card carrier.

According to another aspect of the invention, this object is achieved by an apparatus for bringing together and joining plastic cards, which are provided with an identification mark, and printed card carriers associated with the respective plastic cards, characterized by a carrier means containing the plastic cards;

means for detecting the identification mark of the plastic card and for associating a print job number with said plastic card;

a data base means containing data depending on the identification mark;

a printer which prints onto the card carrier the data read from said data base means as well as the print job number;

a means used for detecting the print job number of the card carrier and for comparing the print job number of the plastic card which is about to be joined to the card carrier with the print job number of the card carrier; and a bringing-together and joining means used for bringing together and joining the plastic card and the card carrier, provided that the print job numbers of the plastic card and of the card carrier correspond.

One advantage of the present invention is to be seen in the fact that the print job number, instead of the identification number, is used on the card carrier. This results in an improvement of data protection, since, in contrast to the identification number, the print job number is not unequivocally associated with a data set related to a specific person, but can, for example, be a number taken from a small group of cyclically recurring numbers. Due to the use of the print job number, the identification number, which is used for accessing e.g. the data base for inquiring e.g. personal data, no longer appears on the card carrier and remains thus unknown to third parties—the plastic card has applied thereto said identification number invisibly, e.g. in a magnetic strip or the like. It follows that the access to personal data of a person, e.g. by unauthorized access to the data base by third persons, can be prevented more reliably in accordance with the present invention.

According to a further aspect of the present invention, a system is provided, which is used for bringing together and joining plastic cards provided with an-identification mark and printed card carriers associated with the respective plastic cards and which is used for packing the plastic cards having applied thereto the card carriers, said system having the following features:

- a tower of cards comprising the plastic cards;
- a temporary store for temporarily storing the plastic cards received from said tower of cards;
- a processing means which detects the identification mark of the plastic card and which associates a print job number with said plastic card;
- a data base from which the data can be read depending on said identification mark;
- a single-sheet printer connected to the processing means, said single-sheet printer printing the card carrier on the basis of the data received from the processing means and providing said card carrier with the print job number;
- a transfer means receiving the card carrier discharged from said single-sheet printer;
- a temporary paper store provided with a single-sheet feed means, a transverse folding means, and a single-sheet discharge means and receiving the card carrier from the transfer means;
- a reader which detects the print job number of the card carrier and transfers it to the processing means and which determines whether the transmitted print job number of the card carrier corresponds to that of the plastic card which is about to be joined to the card carrier
- an application means which is connected to the processing means and which is used for bringing together and joining the plastic card, which comes from the temporary store, and the card carrier, said application means discharging the card carrier plus plastic card, if the print job numbers of said plastic card and of said card carrier correspond; and
- a device for packing the plastic card having applied thereto the card carrier.

According to another aspect of the present invention, a system is provided, which is used for bringing together and joining plastic cards provided with an identification mark and printed card carriers associated with the respective plastic cards and which is used for packing the plastic cards having applied thereto the card carriers, said system having the following features:

- a tower of cards comprising the plastic cards;
- a temporary store for temporarily storing the plastic cards received from said tower of cards;
- a processing means which detects the identification mark of the plastic card and which associates a print job number with said plastic card;
- a data base from which data can be read depending on said identification mark;
- a continuous-paper printer connected to the processing means, said continuous-paper printer printing the card carrier on the basis of the data received from the processing means and providing said card carrier with the print job number;
- loop-type temporary store which arranged in spaced relationship with the continuous-paper printer;
- a cutting machine which separates the continuous paper;
- a reader which detects the print job number of the card carrier and transmits said number to the processing means, and which determines whether the transmitted print job number of the card carrier corresponds to that of the plastic card which is about to be joined to the card carrier;
- a transverse folding means which receives the separated paper;
- an application means which is connected to the processing means and which is used for bringing together and joining the plastic card, which comes from the temporary store, and the card carrier, said application means discharging the card carrier plus plastic card, if the print job numbers of said plastic card and of said card carrier correspond; and
- a device for packing the plastic card having applied thereto the card carrier.

According to still another aspect of the present invention, a system is provided, which is used for bringing together and joining plastic cards provided with an identification mark and printed card carriers associated with the respective plastic cards and which is used for packing the plastic cards having applied thereto the card carriers, said system having the following features:

- a tower of cards comprising the plastic cards;
- a processing means which detects the identification mark of the plastic card and which associates a print job number with said plastic card;
- a data base from which data can be read depending on said identification mark;
- a feed device containing non-personalized paper sheets which have already been preprinted;
- a first rerouting means fed by said feed device;
- an ink-jet printing unit which receives the preprinted, non-personalized paper sheets from said first rerouting means and which prints and thus personalizes the card carrier on the basis of the data received from the processing means and provides said card carrier with the print job number;
- a second rerouting means receiving the printed card carriers;
- a transverse folding means;
- a reader which detects the print job numbers of the card carrier and transmits said numbers to the processing means, and which determines whether the transmitted print job number of the card carrier corresponds to that of the plastic card which is about to be joined to the card carrier;
- an application means which is connected to the processing means and which is used for bringing together and joining the plastic card and the card carrier, said application means discharging the card carrier plus plastic card, if the print job numbers of said plastic card and of said card carrier correspond; and a device for packing the plastic card having applied thereto the card carrier.

BRIEF DESCRIPTION OF THE DRAWINGS

In the following, preferred embodiments of the present invention will be described in detail making reference to the drawings enclosed, in which

FIG. 2 shows a first embodiment of the apparatus for bringing together and joining plastic cards and card carriers according to the present invention;

DESCRIPTION OF A PREFERRED EMBODIMENT OF THE INVENTION

Figure 1:
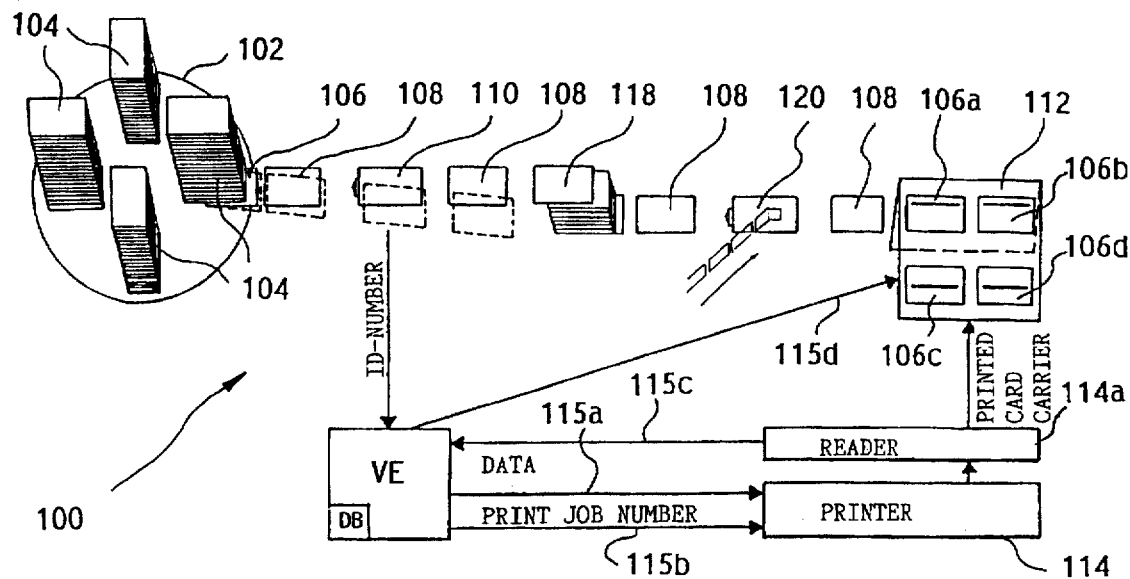
FIG. 1 shows a general representation of an apparatus for bringing together and joining plastic cards and card carriers according to the present invention, which is adapted to be used for carrying out the method according to the present invention.
Figure 5:
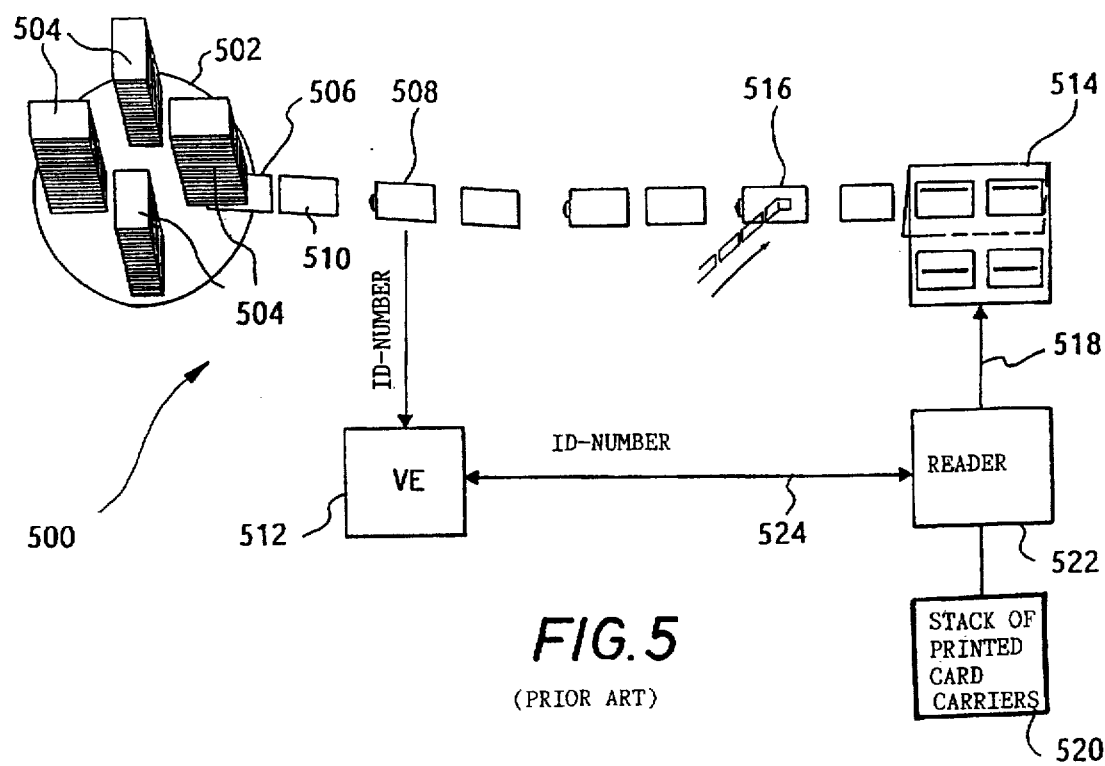
FIG. 5 shows an apparatus according to the prior art carrying out a method according to the prior art.

FIG. 1 shows an apparatus according to the present invention used for bringing together and joining plastic cards, which are provided with an identification mark, and printed card carriers associated with the respective plastic cards. The apparatus according to the present invention is designated generally by reference numeral 100.

The apparatus 100 comprises a carrier means 102, which, in this embodiment, is constructed as a turret. The turret 102 comprises four magazines 104, which each contain plastic cards 106. These cards have already been personalized, but their mode of arrangement in the magazines 104 is unsorted (chaotic). Via so-called stop points 108, a card 106 reaches an detection station 110.

The movement of the cards 106 in the apparatus 100 takes place in a manner which is known per se to those skilled in the art.

The card 106 is moved to an application means 112 via said stop points 108, said application means 112 bringing together and joining the card 106 and a card carrier.

The detection station 110 is connected to a processing means VE having associated therewith a data base DB.

The application means 112 is connected to a printer 114 via a reader 114a.

The printer 114 is connected to the processing means VE by a plurality of data lines 115a, 115b.

The reader 114a is connected to the processing means VE by a data line 115c.

In the following, the mode of operation of the apparatus 100 according to the present invention will be described in detail on the basis of FIG. 1.

The carrier means 102 provides a plastic card 106 from one of its magazines, said plastic card 106 being then moved to the detection station 110. The detection station detects the identification number of the plastic card in connection with the processing means VE and associates a so-called print job number with this plastic card.

The processing means VE reads the data base DB by means of the identification mark and transmits the data to the printer 114 via the data line 115a. Furthermore, the processing means VE transmits the print job number to the printer via the data line 115b.

The printer 114 prints onto a card carrier the data read from the data base as well as the print job number received.

While the card carrier is being printed by the printer, the plastic card 106 moves from the detection station 110 towards the application means 112. When it has reached the last stop point 108 prior to the application means 112, the printed card carrier will be transferred from the printer to the reader 114a. The reader 114a reads the print job number printed on the card carrier and transmits said number via the data line 115c to the processing means VE, which determines whether the print job number of the card carrier corresponds to the print job number of the plastic card 106 occupying the stop point 108 immediately prior to the application means 112. If the two print job numbers correspond, the processing means VE will output a signal via a data line 115d, which has the effect that the application means 112 will bring the plastic card 106 and the card carrier together and join them.

Reference is made to the fact that, with the exception of the printer, all other components of the apparatus according to the present invention are subjected to the system clock. For this reason, a renewed detection of the print job number of the plastic card at the stop point 108 immediately prior to the application means 112 is not necessary, since the period of time, i.e. the number of strokes, which a card 106 needs for travelling from the detection station 110 to the application means 112 is/are known to the processing means VE.

In order to synchronize the bringing together of the cards and the card carriers with the operation of the whole system, the print job number is used, as has been described hereinbefore.

In addition, reference is made to the fact that the print job number is a cyclically recurring number whose repetition rate depends e.g. on the number of cards, which still pass through the detection station 110 after the detection of the identification mark of a card and prior to the joining of said card to the card carrier.

The special configuration of the apparatus decisively depends on the type of printer used. In order to avoid time losses caused by the distance which the card carriers have to travel from the printing mechanism of the printer 114 to the application means 112, a number of read cards corresponding at least to the number of card carriers between the detection station 110 and the application means 112 is stored temporarily. The structural design of the temporary store 118 can, for example, be of such a nature that said temporary store is able to hold 20 to 80, preferably about 50 plastic cards. When such a temporary store 118 is used, it will be advisable to adapt the number of print job numbers to the number of plastic cards contained in the temporary store 118. It follows that, in the case of the example described hereinbefore, the maximum print job number would thus be 50. The next, following print job number would, consequently, have associated therewith the number 1.

In the embodiment shown in FIG. 1, a labeller 120 is additionally provided, said labeller applying a gummed label to the plastic card 106 before said plastic card reaches the application means 112 so that said plastic card can reliably be fastened to the card carrier.

Although, up to now, it has only been described how one plastic card 106 and one card carrier are brought together and joined, it is obvious that the present invention is not limited to the fastening of only one plastic card to one card carrier.

In FIG. 1, an application means 112 is shown with the aid of which up to four plastic cards 106a–d can selectively be brought together with and joined to a single card carrier.

In this case, the plastic cards 106, which are to be brought together with and joined to one card carrier, each have associated therewith the same print job number.

On the basis of FIG. 2 to 5, preferred embodiments of systems will be described hereinbelow, which bring together and join plastic cards provided with an identification mark and printed card carriers associated with the respective plastic cards and which pack the plastic cards having applied thereto the card carriers.

Figure 3:
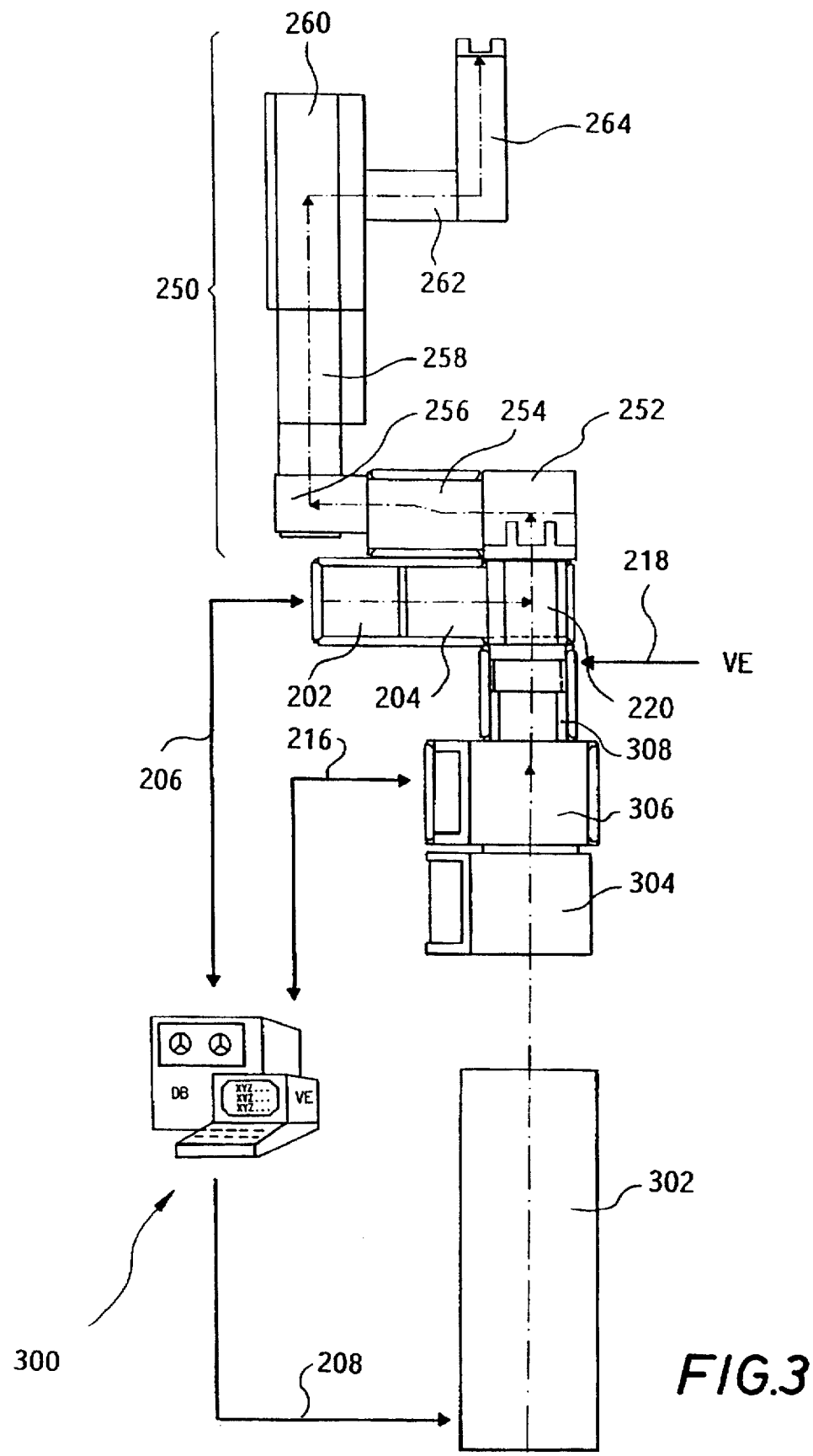
FIG. 3 shows a second embodiment of the apparatus for bringing together and joining plastic cards and card carriers according to the present invention.
Figure 4:
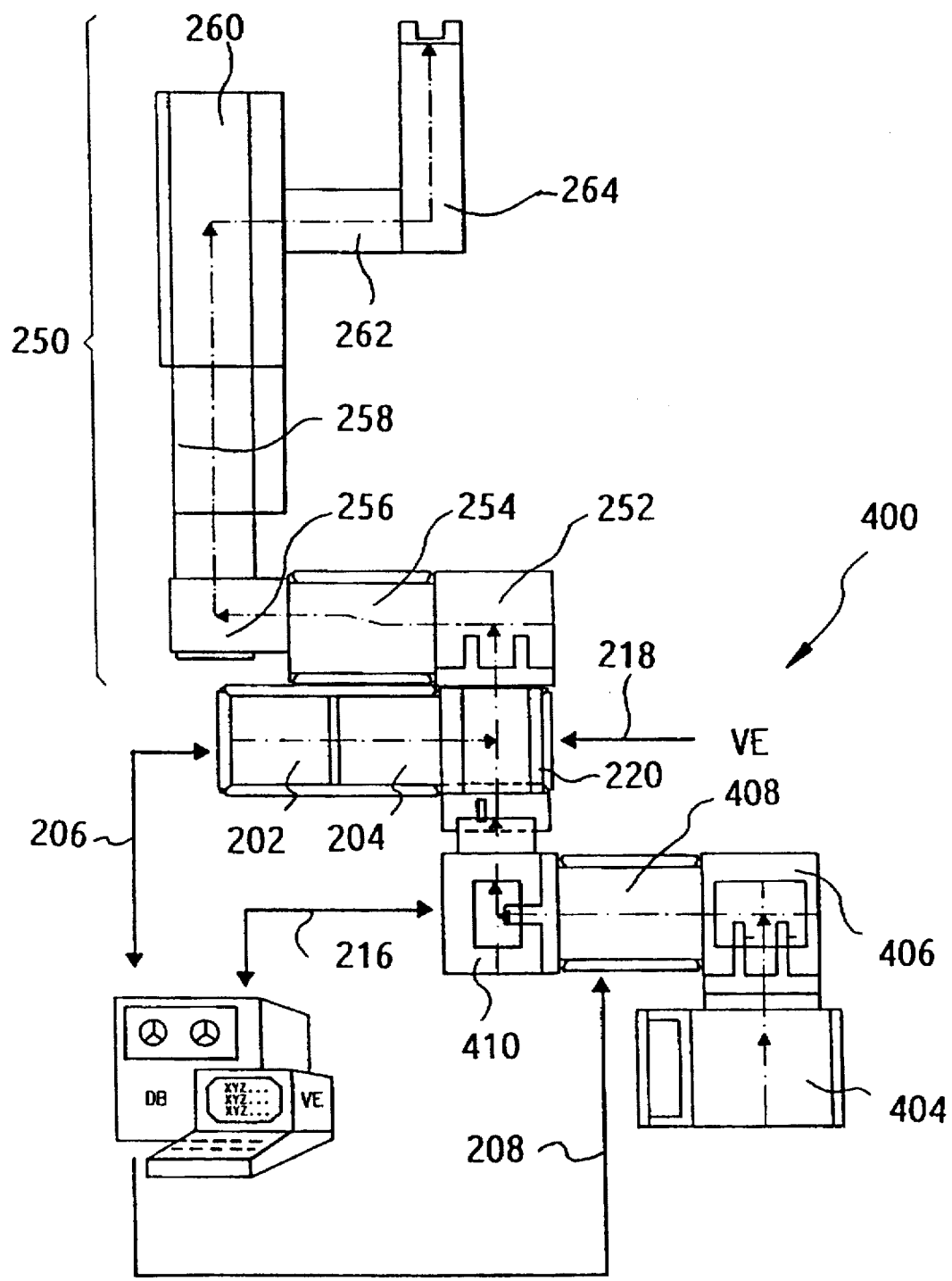
FIG. 4 shows a third embodiment of the apparatus for bringing together and joining plastic cards and card carriers according to the present invention.

In FIG. 2 to 4, like reference numerals have been used throughout to designate identical components.

FIG. 2 shows a system 200, which is provided with a tower 202 of cards comprising the plastic cards. The tower 202 of cards is followed by a reader 204 including a temporary store. Via a data line 206, a processing means VE detects the identification mark of the plastic card, which was read by the reader 204. The processing means VE includes a data base DB from which data can be read in response to the identification mark detected. The processing means VE additionally associates a print job number with the plastic card.

Via an additional data line 208, the processing means VE is connected to a single-sheet printer 210.

The single-sheet printer 210 receives via the data line 208 the data read from the data base DB as well as the print job number associated with the plastic card. The single-sheet printer 210 prints onto the card carrier the data received from the processing means VE as well as the print job number.

The individual sheets, which have been printed by means of the single-sheet printer 210, are received by a transfer means 212 which transfers said individual sheets to a temporary paper store 214.

The temporary paper store is provided with a single-sheet feed means and a single-sheet discharge means. The temporary paper store includes at the output thereof a reader (not shown) which is connected to the processing means VE via a data line 216. The reader reads the print job number of the card carrier and transmits said print job number to the processing means VE via the data line 216.

The processing means VE determines whether the transmitted print job number of the card carrier corresponds to that of the plastic card which is about to be joined to this card carrier.

The processing means VE is connected via a data line 218 to an application means 220. If the processing means VE determines that the print job numbers of the plastic card and of the card carrier correspond, it will supply via the line 218 a signal to the application means, which will bring together and join the plastic card coming from the means 204 and the card carrier coming from the means 214. Subsequently, the application means transfers the card carrier plus the plastic card to a packing means, which is designated generally by reference numeral 250.

The packing means 250 includes a rerouting means 252, which receives the card carrier plus plastic card discharged by the application means 220. The means 252 transfers the card carrier plus plastic card to a longitudinal folding means 254, which, in turn, supplies them to a collector station 256.

Via a collecting path 258, the card carrier plus the plastic card reach a packing and closing means 260. From said packing and closing means 260, they are removed with the aid of a removal means 262, whereupon they are deposited in a scaled band 264 in a scalelike mode of arrangement.

FIG. 3 shows an additional embodiment of a system 300, which is used for bringing together and joining plastic cards provided with an identification number and printed card carriers associated with the respective plastic cards and which is used for packing the plastic cards having applied thereto the card carriers. This system is designated generally by reference numeral 300.

Like reference numerals have been used to designate components which correspond to the components shown in FIG. 2. These components will not be described again.

This system 300 differs from the system according to FIG. 2 insofar as a continuous-paper printer 302 is used instead of a single-sheet printer.

A loop-type temporary store 304, which temporarily stores the continuous paper in a looplike mode of arrangement, is arranged in spaced relationship with the continuous-paper printer 302. A loop of paper forms between said loop-type temporary store and said continuous-paper printer 302.

Said loop-type temporary store 304 is followed by a cutting machine 306 which separates the continuous paper. Also the cutting machine has associated therewith a reader, which is connected to the processing means VE via the data line 216. This has already been described with reference to FIG. 2.

Between the cutting means 306 and the application means 220, a transverse folding means 308 is arranged, which receives the separated paper from the cutting machine 306, provides it with a transverse fold and discharges it to the application means 220.

Also FIG. 4 shows an additional embodiment of a system, which is used for bringing together and joining plastic cards provided with an identification mark and printed card carriers associated with the respective plastic cards and which is used for packing the plastic cards having applied thereto the card carriers.

This system is designated generally by reference numeral 400, and like reference numerals have been used to designate components corresponding to the components which have been described on the basis of FIG. 2. These components will not be described again.

Said system 400 differs from the preceding systems 200, 300 insofar as no temporary store is provided, but only a reader 204, which is positioned at the input of the application means 220. In the following, it will be described for which reasons the temporary store can be dispensed with in the case of this embodiment.

The system 400 includes a feed device 404 containing non-personalized paper sheets which have already been preprinted, i.e. these paper sheets have already printed thereon e.g. preformulated letter texts etc. so that it will only be necessary to insert the personal data. The feed device 404 feeds a an ink-jet printer 408 via a first rerouting means 406. The ink-jet printer 408 inserts the necessary data in the preprinted paper sheets, said data being e.g. name, address, etc., and the print job number, which is supplied from the processing means VE via the data line 208 to said ink-jet printer 408 in the manner which has already been described hereinbefore.

Via a second rerouting means 410, the card carrier can be supplied to the application means 220.

The second rerouting means 410 can also comprise a reader (not shown) which detects the print job number in the manner which has already been described hereinbefore.

The reason for the fact that a temporary store can be dispensed with in this embodiment is that the printer only has to print the print job number as well as the name, address etc. onto the card carrier which is already present in the apparatus. The number of card carriers in the apparatus does not exceed the number of plastic cards after the detection station and before the application means. Hence, it is not necessary to store the plastic cards intermediately. Deviating from the above-described embodiment, the reader can also be provided at the output of the ink-jet printer.

We claim:

1. A method of bringing together and joining cards, which are personalized and provided with an identification mark, and printed card carriers associated with the respective cards, comprising the steps of:
   a) providing the card;
   b) detecting the identification mark of said card;
   c) associating a print job number with said card, the print job number being not unequivocally associated with data related to a card holder;
   d) reading a data base addressed by means of said identification mark;
   e) printing on the card carrier data read from the data base as well as the print job number;
   f) detecting the print job number of the card carrier prior to joining said card carrier to the card;
   g) determining whether the print job number of the card, which is about to be joined to the card carrier, corresponds to the print job number detected in step f); and,
   h) provided that the print job number of the card and that of the card carrier correspond, bringing together and joining the card and the card carrier.

2. A method according to claim 1, wherein the print job number is a cyclically recurring number.

3. A method according to claim 1, further comprising the following step after step b):
   storing the cards temporarily.

4. A method according to claim 3, wherein 20 to 80, preferably about 50 cards are stored temporarily.

5. A method according to claim 3, wherein the number of print job numbers corresponds at least to the maximum number of temporarily stored cards.

6. A method according to claim 1, further comprising the following step carried out prior to step h):
   applying a gummed label to the card.

7. A method according to claim 1, wherein a plurality of cards is brought together with and joined to a card carrier, each of said plurality of cards having associated therewith the same print job number.

8. An apparatus for bringing together and joining cards, which are personalized and provided with an identification mark, and printed card carriers associated with the respective cards, said apparatus comprising:
   a carrier means containing the cards;
   means for detecting the identification mark of the card and for associating a print job number with said card, the print job number being not unequivocally associated with data related to a card holder;
   a data base means containing data addressable by means of the identification mark;
   a printer which prints onto the card carrier the data read from said data base means as well as the print job number;
   a means used for detecting the print job number of the card carrier and for comparing the print job number of the card which is about to be joined to the card carrier with the print job number of the card carrier; and
   a bringing together and joining means used for bringing together and joining the card and the card carrier, provided that the print job numbers of the card and of the card carrier correspond.

9. An apparatus according to claim 8, wherein the print job number is a cylically recurring number.

10. An apparatus according to claim 8 further comprising:
    a temporary store which is provided for temporarily storing the cards.

11. An apparatus according to claim 10, wherein the temporary store receives therein 20 to 80, preferably about 50 cards.

12. An apparatus according to claim 10, wherein the print job number corresponds to the number of cards contained in the temporary store.

13. An apparatus according to claim 8, further comprising:
    a means which applies a gummed label to the card.

14. An apparatus according to claim 8, wherein the bringing-together and joining means brings together and joins a plurality of cards to one card carrier, each of said plurality of cards having associated therewith the same print job number.

15. A system, which is used for bringing together and joining cards, which are personalized and provided with an identification mark, and printed card carriers associated with the respective cards, and which is used for packing the cards having applied thereto the card carriers, said system comprising:
    a tower of cards comprising the cards;
    a temporary store for temporarily storing the cards received from said tower of cards;
    a processing means which detects the identification mark of the card and which associates a print job number with said card, the print job number being not unequivocally associated with data related to a card holder;
    a data base from which data can be read addressable by said identification mark;
    a single-sheet printer connected to the processing means, said single-sheet printer printing the card carrier on the basis of the data received from the processing means and providing said card carrier with the print job number;
    a transfer means receiving the card carrier discharged from said single-sheet printer;
    a temporary paper store provided with a single-sheet feed means, a transverse folding means, and a single-sheet discharge means and receiving the card carrier from the transfer means;
    a reader which detects the print job number of the card carrier and transfers it to the processing means and which determines whether the transmitted print job number of the card carrier corresponds to that of the card which is about to be joined to the card carrier;
    an application means which is connected to the processing means and which is used for bringing together and joining the card, which comes from the temporary store, and the card carrier, said application means discharging the card carrier plus card, if the print job numbers of said card and of said card carrier correspond; and a device for packing the card having applied thereto the card carrier.

16. A system which is used for bringing together and joining cards, which are personalized and provided with an identification mark, and printed card carriers associated with the respective cards, and which is used for packing the cards having applied thereto the card carriers, said system comprising:

- a tower of cards comprising the cards;
- a temporary store for temporarily storing the cards received from said tower of cards;
- a processing means which detects the identification mark of the card and which associates a print job number with said card, the print job number being not unequivocally associated with data related to a card holder;
- a data base from which the data can be read addressable by said identification mark;
- a continuous-paper printer connected to the processing means, said continuous paper printer printing the card carrier on the basis of the data received from the processing means and providing said card carrier with the print job number;
- a loop-type temporary store which is arranged in spaced relationship with the continuous-paper printer;
- a cutting machine which separates the continuous paper;
- a reader which detects the print job number of the card carrier and transmits said number to the processing means, and which determines whether the transmitted print job number of the card carrier corresponds to that of the card which is about to be joined to the card carrier;
- a transverse folding means which receives the separated paper;
- an application means which is connected to the processing means and which is used for bringing together and joining the card, which comes from the temporary store, and the card carrier, said application means discharging the card carrier plus card, if the print job numbers of said card and of said card carrier correspond; and
- a device for packing the card having applied thereto the card carrier.

17. A system which is used for bringing together and joining cards, which are personalized and provided with an identification mark, and printed card carriers associated with the respective cards and which is used for packing the cards having applied thereto the card carriers, said system comprising:

- a tower of cards comprising the cards;
- a processing means which detects the identification mark of the card and which associates a print job number with said card, the print job number being not unequivocally associated with data related to a card holder;
- a data base from which data can be read addressable by said identification mark;
- a feed device containing non-personalized paper sheets which have already been preprinted;
- a first rerouting means fed by said feed device;
- an ink-jet printing unit which receives the preprinted, non-personalized paper sheets from said first rerouting means and which prints the card carrier on the basis of the data received from the processing means and provides said card carrier with the print job number;
- a second rerouting means receiving the printed card carriers;
- a transverse folding means;
- a reader which detects the print job numbers of the card carrier and transmits said numbers to the processing means, and which determines whether the transmitted print job number of the card carrier corresponds to that of the card which is about to be joined to the card carrier;
- an application means which is connected to the processing means and which is used for bringing together and joining the card and the card carrier, said application means discharging the card carrier plus card, if the print job numbers of said card and of said card carrier correspond; and
- a device for packing the card having applied thereto the card carrier.

18. A system according to claim 15, wherein the device for packing the card having applied thereto the card carrier comprises:

- a rerouting means;
- a longitudinal folding means;
- a collector station;
- a collecting path;
- a packing and closing means;
- a removal means; and
- a scaled band.

19. A system according to claim 16, wherein the device for packing the card having applied thereto the card carrier comprises:

- a rerouting means;
- a longitudinal folding means;
- a collector station;
- a collecting path;
- a packing and closing means;
- a removal means; and
- a scaled band.

20. A system according to claim 17, wherein the device for packing the card having applied thereto the card carrier comprises:

- a rerouting means;
- a longitudinal folding means;
- a collector station;
- a collecting path;
- a packing and closing means;
- a removal means; and
- a scaled band.

* * * * *